US012562832B2

(12) United States Patent
Okada et al.

(10) Patent No.: US 12,562,832 B2
(45) Date of Patent: Feb. 24, 2026

(54) OPTICAL COMMUNICATION DEVICE THAT TRANSMITS WDM SIGNAL AND TRANSMISSION CONTROL METHOD

(71) Applicant: Fujitsu Limited, Kawasaki (JP)

(72) Inventors: Shun Okada, Kawasaki (JP); Akio Sugama, Atsugi (JP)

(73) Assignee: 1FINITY INC., Kawasaki (JP)

( * ) Notice: Subject to any disclaimer, the term of this patent is extended or adjusted under 35 U.S.C. 154(b) by 184 days.

(21) Appl. No.: 18/510,021

(22) Filed: Nov. 15, 2023

(65) Prior Publication Data

US 2024/0214103 A1 Jun. 27, 2024

(30) Foreign Application Priority Data

Dec. 27, 2022 (JP) ................................. 2022-209366

(51) Int. Cl.
*H04J 14/02* (2006.01)
*H04Q 11/00* (2006.01)

(52) U.S. Cl.
CPC ...... *H04J 14/0212* (2013.01); *H04J 14/0213* (2013.01); *H04Q 11/0001* (2013.01); *H04Q 2011/0009* (2013.01); *H04Q 2011/0011* (2013.01)

(58) Field of Classification Search
None
See application file for complete search history.

(56) References Cited

U.S. PATENT DOCUMENTS

| | | | | | |
|---|---|---|---|---|---|
| 8,625,994 | B2 * | 1/2014 | Archambault | ..... | H04Q 11/0005 398/43 |
| 2001/0007509 | A1 | 7/2001 | Aso et al. | | |
| 2006/0140625 | A1 * | 6/2006 | Ooi | ...... | H04J 14/022 398/19 |
| 2007/0172240 | A1 * | 7/2007 | Terai | ..... | H04J 14/0212 398/83 |
| 2012/0237219 | A1 * | 9/2012 | Ooi | ...... | H04J 14/0209 385/16 |
| 2013/0223794 | A1 * | 8/2013 | Boduch | ..... | H04J 14/0209 385/24 |

(Continued)

FOREIGN PATENT DOCUMENTS

| | | |
|---|---|---|
| JP | 2001-249368 | 9/2001 |
| JP | 2020-137042 | 8/2020 |
| WO | WO 2016/051774 A1 | 4/2016 |

*Primary Examiner* — Darren E Wolf
(74) *Attorney, Agent, or Firm* — STAAS & HALSEY LLP

(57) ABSTRACT

An optical communication device processes a WDM signal in a WDM transmission system that uses a first wavelength band and a second wavelength band. A wavelength filter extracts a first WDM signal allocated in the first wavelength band and a second WDM signal allocated in the second wavelength band from a WDM signal received from first node. An optical signal branched from the first WDM signal is guided to an access network and a remaining optical signal that is not branched from the first WDM signal is guided to second node. An optical signal branched from the second WDM signal is guided to the access network via a wavelength converter and a remaining optical signal that is not branched from the second WDM signal is guided to the second node. The wavelength converter converts wavelengths from the second wavelength band to a third wavelength band.

6 Claims, 10 Drawing Sheets

(56) References Cited

U.S. PATENT DOCUMENTS

| | | | | |
|---|---|---|---|---|
| 2017/0299814 A1* | 10/2017 | Mikami | ............. | H04J 14/0307 |
| 2018/0307119 A1* | 10/2018 | Kato | .................... | G02B 6/272 |
| 2020/0274633 A1* | 8/2020 | Yuki | ................. | H04J 14/0202 |

* cited by examiner

WAVELENGTH

1

OPTICAL COMMUNICATION DEVICE THAT TRANSMITS WDM SIGNAL AND TRANSMISSION CONTROL METHOD

CROSS-REFERENCE TO RELATED APPLICATION

This application is based upon and claims the benefit of priority of the prior Japanese Patent Application No. 2022-209366, filed on Dec. 27, 2022, the entire contents of which are incorporated herein by reference.

FIELD

The embodiments discussed herein are related to an optical communication device that transmits a WDM (wavelength division multiplexing) signal and a method of controlling transmission of a WDM signal.

BACKGROUND

In order to realize large-capacity optical communication, WDM transmission has been put into practical use. WDM can transmit a plurality of optical signals through one optical fiber by multiplexing a plurality of wavelength channels. Each node of a WDM transmission system is provided with, for example, a reconfigurable optical add-drop multiplexer (ROADM). The ROADM can branch an optical signal having a desired wavelength from a WDM signal. The branched optical signal is forwarded to, for example, an access network. The ROADM can insert an optical signal received from the access network into a free channel of the WDM signal.

In existing WDM transmission systems, C (Conventional)-band and/or L (Long Wavelength)-band are used. The range of wavelength of the C-band is about 1530 to 1565 nm, and the range of wavelength of the L-band is about 1565 to 1625 nm. A plurality of wavelength channels can be established in each band.

In recent years, in order to realize a further increase in the capacity of optical communication, WDM transmission that uses S (Short Wavelength)-band and/or U (Ultra-Long Wavelength) -band in addition to the C-band/L-band has been studied. The range of wavelength of the S-band is about 1460 to 1530 nm, and the range of wavelength of the U-band is about 1625 to 1675 nm.

Note that International Publication Pamphlet No. WO2016/051774 describes an OADM system and a ROADM system having a function of separating and combining optical signals in wavelength units. Japanese Laid-open Patent Publication No. 2001-249368 describes a wavelength conversion device useful for configuring a WDM network in optical communication for transmitting optical signals multiplexed by the WDM scheme.

When a WDM transmission system uses a plurality of wavelength bands (S, C, L, U, and the like), the ROADM may include one or more wavelength converters. For example, it is assumed that the WDM transmission system transmits optical signals using wavelength channels in the C-band and wavelength channels in the S-band. It is also assumed that the ROADM includes a wavelength selective switch (WSS) that processes a wavelength channel in the C-band. In this case, the ROADM includes a wavelength converter that converts wavelengths between the S-band and the C-band.

However, in this configuration, an optical signal-to-noise ratio (OSNR) may be degraded due to noise generated in the wavelength converter. Thus, when the WDM signal passes through a plurality of nodes (that is, a plurality of ROADMs), the degradation of the OSNR is accumulated, and the communication quality may be deteriorated.

SUMMARY

According to an aspect of the embodiments, an optical communication device processes a WDM (wavelength division multiplexing) signal in a WDM transmission system that uses a first wavelength band and a second wavelength band different from the first wavelength band. The optical communication device includes: a wavelength filter configured to extract a first WDM signal allocated in the first wavelength band and a second WDM signal allocated in the second wavelength band from a reception WDM signal received from a first node of the WDM transmission system; a first wavelength selective switch configured to process the first WDM signal extracted by the wavelength filter; a second wavelength selective switch configured to process the second WDM signal extracted by the wavelength filter; a third wavelength selective switch; a wavelength converter configured to convert wavelengths from the second wavelength band to a third wavelength band; a fourth wavelength selective switch configured to process an optical signal in the first wavelength band; a fifth wavelength selective switch configured to process an optical signal in the second wavelength band; and a combiner configured to combine an optical signal output from the fourth wavelength selective switch and an optical signal output from the fifth wavelength selective switch. An optical signal branched from the first WDM signal by the first wavelength selective switch is guided to the third wavelength selective switch. A remaining optical signal that is not branched from the first WDM signal by the first wavelength selective switch is guided to the fourth wavelength selective switch. An optical signal branched from the second WDM signal by the second wavelength selective switch is guided to the third wavelength selective switch via the wavelength converter. A remaining optical signal that is not branched from the second WDM signal by the second wavelength selective switch is guided to the fifth wavelength selective switch. The third wavelength selective switch guides the optical signal branched from the first WDM signal and the optical signal branched from the second WDM signal to an access network connected to the optical communication device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
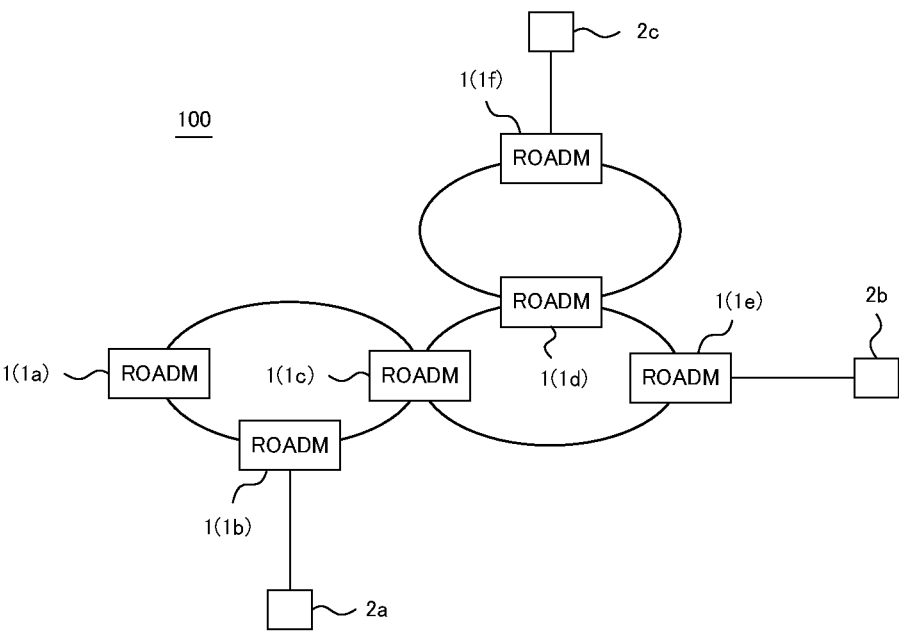
FIG. 1 illustrates an example of a WDM transmission system according to an embodiment of the present invention.

FIG. 1 illustrates an example of a WDM transmission system according to an embodiment of the present invention. In this example, a WDM transmission system 100 connects a plurality of networks (e.g., a core network and a metropolitan network) to each other. Each node of the WDM transmission system 100 is provided with ROADMs 1 (1*a* to 1*f*). The ROADM 1 is an example of an optical communication device that processes a WDM signal. Therefore, the ROADM 1 can branch an optical signal having a desired wavelength from a WDM signal. The optical signal branched from the WDM signal is guided to an access network or a device under the ROADM 1. The ROADM 1 can insert an optical signal transmitted from the access network or a device under the ROADM 1 into a free channel of the WDM signal.

It is assumed that in the WDM transmission system 100 having the above configuration, communication is performed between a terminal 2*a* and a terminal 2*b*, for example. For this communication, a wavelength path is established between the terminals 2*a* and 2*b* by a network management system not illustrated. In other words, control information for performing communication between the terminal 2*a* and the terminal 2*b* is configured in each of the ROADMs 1. Note that it is assumed that this wavelength path is realized by a wavelength channel that propagates an optical signal of wavelength λ1. In the following, the optical signal of the wavelength λ1 may be referred to as an "optical signal λ1".

The data to be transmitted from the terminal 2*a* to the terminal 2*b* is guided to a transponder that generates the optical signal λ1. This transponder is connected, for example, to the ROADM 1*b*. This transponder generates an optical signal λ1 that transmits the data. The optical signal λ1 output from the transponder is guided to the ROADM 1*b*. The ROADM 1*b* inserts the optical signal λ1 into the WDM signal. Each of the ROADMs 1 processes the WDM signal according to control information configured by the network management system. Specifically, the ROADM 1*b* guides the optical signal λ1 to the ROADM 1*c*, and the ROADM 1*c* guides the optical signal λ1 to the ROADM 1*e*. The ROADM 1*e* branches the optical signal λ1 from the WDM signal and guides the optical signal λ1 to the access network. Thus, the terminal 2*b* receives the data transmitted from the terminal 2*a*.

When communication is performed between the terminals 2*a* and 2*c*, a wavelength path is established between the terminals 2*a* and 2*c* by the network management system. It is assumed that this wavelength path is realized by a wavelength channel that propagates an optical signal of wavelength λ2. In the following, the optical signal of the wavelength λ2 may be referred to as an "optical signal λ2".

The data to be transmitted from the terminal 2*a* to the terminal 2*c* is guided to a transponder that generates the optical signal λ2. This transponder generates an optical signal λ2 that transmits the data. The optical signal λ2 output from the transponder is guided to the ROADM 1*b*. The ROADM 1*b* inserts the optical signal λ2 into the WDM signal. Each of the ROADMs 1 processes the WDM signal according to control information configured by the network management system. Specifically, the ROADM 1*b* guides the optical signal λ2 to the ROADM 1*c*, the ROADM 1*c* guides the optical signal λ2 to the ROADM 1*d*, and the ROADM 1*d* guides the optical signal λ2 to the ROADM 1*f*. The ROADM 1*f* branches the optical signal λ2 from the WDM signal and guides the optical signal λ2 to the access network. Thus, the terminal 2*c* receives the data transmitted from the terminal 2*a*.

As described above, in the WDM transmission system 100, the optical signal transmitted from the access network or terminals is inserted into the WDM signal and transmitted via one or more ROADMs. This optical signal is branched from the WDM signal by the ROADM that accommodates a destination terminal.

Figure 2:
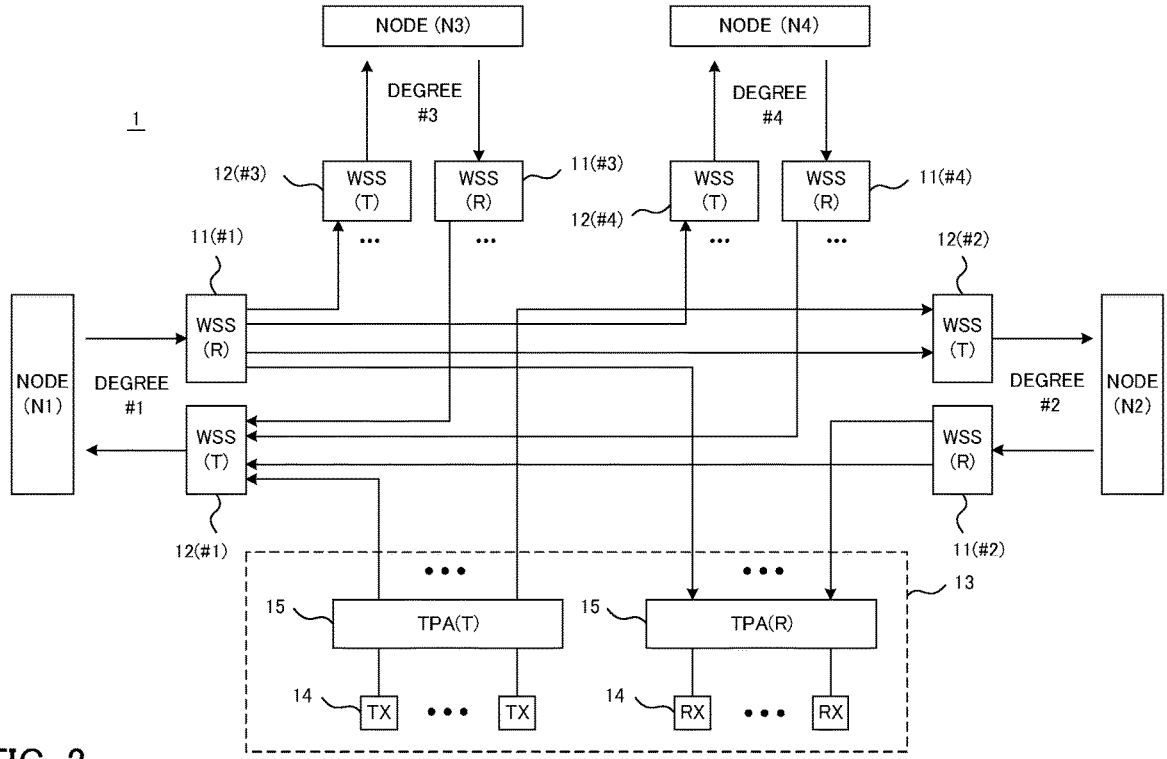
FIG. 2 illustrates an example of the configuration of a ROADM.

FIG. 2 illustrates an example of the configuration of a ROADM. In this example, a ROADM 1 is a four-degree ROADM. In other words, the ROADM 1 can transmit a WDM signal to and receive a WDM signal from four nodes (N1 to N4). The ROADM 1 includes an add-drop unit 13.

The ROADM 1 includes one set of WSS 11 and WSS 12 for each degree (#1 to #4). The WSS 11 processes the WDM signal received from the corresponding node. In other words, the WSS 11 processes each optical signal in the received WDM signal according to the wavelengths. For example, the WSS 11 (#1) guides each optical signal in the WDM signal received from the node N1 to the WSS 12 (#2) corresponding to the degree #2, the WSS 12 (#3) corresponding to the degree #3, the WSS 12 (#4) corresponding to the degree #4, or the add-drop unit 13 according to the wavelengths. The WSS 12 generates a WDM signal transmitted to the corresponding node. For example, the WSS 12 (#1) generates a WDM signal by combining optical signals guided from the WSS 11(#2) corresponding to the degree #2, the WSS 11 (#3) corresponding to the degree #3, the WSS 11 (#4) corresponding to the degree #4, and the add-drop unit 13.

The add-drop unit 13 includes a plurality of transponders 14 and a transponder aggregator (TPA) 15 that accommodates the plurality of transponders 14. Each of the transponders 14 includes an optical transmitter (TX) and an optical receiver (RX). Note that different wavelengths are preferably assigned to the plurality of transponders 14. The TPA 15 includes a WSS or a multicast switch (MCS) and can connect any of the transponders 14 with any of the degrees.

For example, when a signal addressed to the node N1 is generated by the transponder 14, the TPA 15 guides the signal to the WSS 12 (#1). When a signal is guided from any of the WSSs 11, the TPA 15 guides the signal to the transponder 14 corresponding to a destination of the signal.

As described above, the ROADM processes the WDM signal using the WSS. Here, in order to further increase the capacity of optical communication, WDM transmission that uses the S-band and/or U-band in addition to the C-band/L-band has been studied. In this case, the ROADM is required to include a WSS capable of processing the S-band, C-band, L-band, and U-band. However, it is not easy to manufacture a WSS that processes a wide-bandwidth WDM signal. Alternatively, a WSS that processes a wide-bandwidth WDM signal is expensive.

This problem can be solved by appropriately converting the wavelength of an optical signal using a wavelength converter in the ROADM. For example, by providing a wavelength converter that converts the wavelength of an optical signal between the S-band and the C-band and a wavelength converter that converts the wavelength of an optical signal between the U-band and the L-band, the ROADM can process the WDM signal including the S/C/ L/U-band by using the WSS corresponding to the C/L-band.

Figure 3:
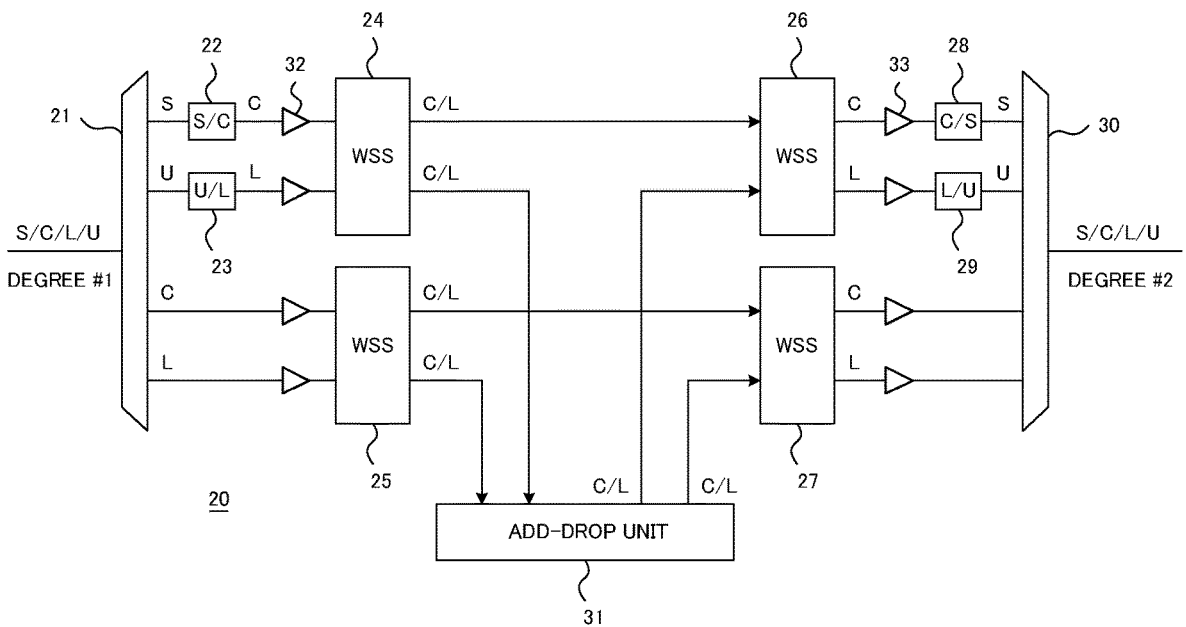
FIG. 3 illustrates an example of a ROADM in which a band is expanded by using a wavelength converter.

FIG. 3 illustrates an example of a ROADM in which a band is expanded by using a wavelength converter. Note that in the example illustrated in FIG. 3, a ROADM 20 has two degrees (#1 and #2). In other words, the ROADM 20 can transmit a WDM signal to and receive a WDM signal from the node N1 via the degree (line) #1, and can transmit a WDM signal to and receive a WDM signal from the node N2 via the degree (line) #2. However, in FIG. 3, a circuit for transmitting a WDM signal from the node N1 to the node N2 is illustrated, and a circuit for transmitting a WDM signal from the node N2 to the node N1 is omitted, in order to make the figure easy to see.

Figure 4:
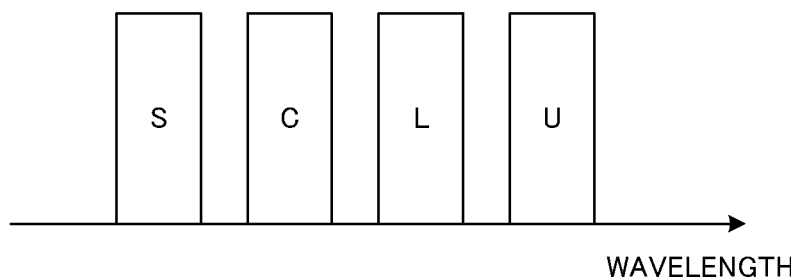
FIG. 4 illustrates an example of a WDM signal whose band is expanded.

The ROADM 20 transmits the WDM signal including the S-band, C-band, L-band, and U-band illustrated in FIG. 4. Note that "S", "C", "L", and "U" illustrated in FIG. 3 represent the S-band, C-band, L-band, and U-band, respectively. "S/C/L/U" represents a state in which the S-band, C-band, L-band, and U-band are multiplexed. Similarly, "C/L" represents a state in which the C-band and L-band are multiplexed.

The ROADM 20 includes a wavelength filter 21, wavelength converters 22 and 23, WSSs 24 to 27, wavelength converters 28 and 29, a combiner 30, and an add-drop unit 31. Note that the ROADM 20 may include other devices, circuits, or functions not illustrated in FIG. 3.

The wavelength filter 21 separates the WDM signal arriving at the ROADM 20 via the degree (line) #1 for each wavelength band. Specifically, the wavelength filter 21 extracts an S-band WDM signal, a C-band WDM signal, an L-band WDM signal, and a U-band WDM signal from the received WDM signal, respectively.

The wavelength converter 22 can convert wavelengths from the S-band to the C-band. Therefore, the wavelength converter 22 converts the S-band WDM signal extracted by the wavelength filter 21 to a C-band WDM signal. The wavelength converter 23 can convert wavelengths from the U-band to the L-band. Therefore, the wavelength converter 23 converts the U-band WDM signal extracted by the wavelength filter 21 to the L-band WDM signal.

The C-band WDM signal generated by the wavelength converter 22 and the L-band WDM signal generated by the wavelength converter 23 are respectively guided to the WSS 24. The C-band WDM signal and the L-band WDM signal extracted by the wavelength filter 21 are respectively guided to the WSS 25 without being wavelength-converted.

The WSS 24 and WSS 25 each process an optical signal in the input WDM signal. Specifically, the WSS 24 guides an optical signal to be transmitted to the node N2 to the WSS 26, and guides an optical signal to be transmitted to the access network to the add-drop unit 31. Similarly, the WSS 25 guides an optical signal to be transmitted to the node N2 to the WSS 27, and guides an optical signal to be transmitted to the access network to the add-drop unit 31. The add-drop unit 31 forwards the optical signals guided from the WSS 24 and WSS 25 to respective destination terminals in the access network.

The add-drop unit 31 can generate an optical signal to be transmitted to the node N2. The optical signal to be transmitted to the node N2 is guided to the WSS 26 or WSS 27.

The optical signal to be transmitted from the ROADM 20 to the node N2 by using the S-band or U-band is guided from the add-drop unit 31 to the WSS 26. However, the optical signal to be transmitted to the node N2 by using the S-band has been allocated in the C-band between the add-drop unit 31 and the WSS 26. The optical signal to be transmitted to the node N2 using the U-band has been allocated in the L-band between the add-drop unit 31 and the WSS 26. On the other hand, the optical signal to be transmitted from the ROADM 20 to the node N2 by using the C-band or L-band is guided from the add-drop unit 31 to the WSS 27. The optical signal to be transmitted to the node N2 by using the C-band has been allocated in the C-band between the add-drop unit 31 and the WSS 27. The optical signal to be transmitted to the node N2 by using the L-band has been allocated in the L-band between the add-drop unit 31 and the WSS 27.

The WSS 26 processes optical signals guided from the WSS 24 and the add-drop unit 31. At this point, the optical signal allocated in the C-band is guided to the wavelength converter 28, and the optical signal allocated in the L-band is guided to the wavelength converter 29.

The wavelength converter 28 can convert wavelengths from the C-band to the S-band. Therefore, the optical signal guided from the WSS 26 is allocated in the S-band by the wavelength converter 28. The wavelength converter 29 can convert wavelengths from the L-band to the U-band. Therefore, the optical signal guided from the WSS 26 is allocated in the U-band by the wavelength converter 29. The optical signals output from the wavelength converter 28 and wavelength converter 29 are guided to the combiner 30.

The WSS 27 processes optical signals guided from the WSS 25 and the add-drop unit 31. At this point, the optical signal to be transmitted to the node N2 is guided to the combiner 30 without being wavelength-converted.

The combiner 30 combines the S-band WDM signal output from the wavelength converter 28, the U-band WDM signal output from the wavelength converter 29, and the C/L-band WDM signal output from the WSS 27. Thus, an S/C/L/U-band WDM signal is generated. In other words, the S/C/L/U-band WDM signal is transmitted from the ROADM 20 to the node N2.

Note that, as illustrated in FIG. 3, optical amplifiers 32 are provided between the wavelength converters 22 and 23 and the WSS 24 and between the wavelength filter 21 and the WSS 25, respectively. Optical amplifiers 33 are provided between the WSS 26 and the wavelength converters 28 and 29 and between the WSS 27 and the combiner 30, respectively. The optical amplifiers 32 and 33 amplify the WDM signal.

As described above, by providing the wavelength converters (22, 28) that convert wavelengths between the S-band and the C-band and the wavelength converters (23, 29) that convert wavelengths between the U-band and the L-band, the ROADM 20 can process the S/C/L/U-band WDM signal by using the WSS corresponding to the C/L-band. In other words, the band of the WDM signal that can be processed by the ROADM is expanded without increasing a bandwidth of the WSS implemented in the ROADM.

However, in the configuration illustrated in FIG. 3, an optical signal-to-noise ratio (OSNR) is degraded due to the addition of the wavelength converter in the ROADM. Specifically, noise is added to the optical signal in the S/U-band WDM signal when the optical signal passes through the wavelength converter. Therefore, in a case where the optical signal in the S/U-band WDM signal is transmitted via a plurality of ROADMs, the degradation of the OSNR is accumulated.

Embodiments

Figure 5:
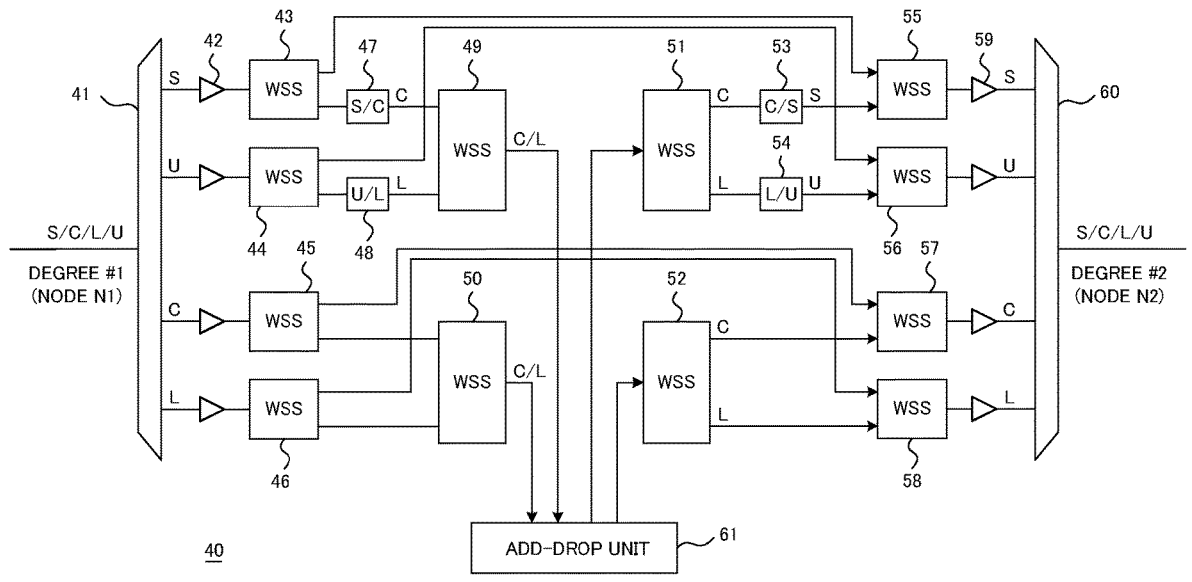
FIG. 5 illustrates an example of a ROADM according to an embodiment of the present invention.

FIG. 5 illustrates an example of a ROADM according to an embodiment of the present invention. Note that, in the embodiment illustrated in FIG. 5, a ROADM 40 has two degrees (#1 and #2). In other words, the ROADM 40 can transmit a WDM signal to and receive a WDM signal from the node N1 via the degree (line) #1, and can transmit a WDM signal to and receive a WDM signal from the node N2 via the degree (line) #2. However, in FIG. 5, a circuit for transmitting a WDM signal from the node N1 to the node N2 is illustrated, and a circuit for transmitting a WDM signal from the node N2 to the node N1 is omitted, in order to make the figure easy to see.

The ROADM 40 transmits S/C/L/U-band WDM signal including the S-band, C-band, L-band, and U-band illustrated in FIG. 4. "S", "C", "L", and "U" illustrated in FIG. 5 represent the C-band, and S-band, L-band, U-band, respectively. "S/C/L/U" represents a state in which the S-band, C-band, L-band, and U-band are multiplexed, and "C/L" represents a state in which the C-band and L-band are multiplexed.

The ROADM 40 includes a wavelength filter 41, optical amplifiers 42, WSSs 43 to 46, wavelength converters 47 and 48, WSSs 49 to 52, wavelength converters 53 and 54, WSSs 55 to 58, optical amplifiers 59, a combiner 60, and an add-drop unit 61. Note that the ROADM 40 may include other devices, circuits, or functions not illustrated in FIG. 5.

The wavelength filter 41 separates the WDM signal arriving at the ROADM 40 via the degree (line) #1 for each wavelength band. Specifically, the wavelength filter 41 extracts an S-band WDM signal, a U-band WDM signal, a C-band WDM signal, and an L-band WDM signal from the received WDM signal. The optical amplifiers 42 amplify the WDM signal of each wavelength band extracted by the wavelength filter 41.

The WSS 43 processes the S-band WDM signal extracted by the wavelength filter 41. Specifically, the WSS 43 guides an optical signal to be transmitted to the node N2 to the WSS 55, and guides an optical signal to be transmitted to the access network to the wavelength converter 47. In other words, the optical signal branched from the S-band WDM signal by the WSS 43 is guided to the wavelength converter 47, and the remaining optical signal that is not branched from the S-band WDM signal is guided to the WSS 55. Similarly, the WSS 44 processes the U-band WDM signal extracted by the wavelength filter 41. Specifically, the WSS 44 guides an optical signal to be transmitted to the node N2 to the WSS 56, and guides an optical signal to be transmitted to the access network to the wavelength converter 48. In other words, the optical signal branched from the U-band WDM signal by the WSS 44 is guided to the wavelength converter 48, and the remaining optical signal that is not branched from the U-band WDM signal is guided to the WSS 56.

The wavelength converter 47 can convert wavelengths from the S-band to the C-band. Therefore, the wavelength converter 47 allocates the optical signals in the S-band guided from the WSS 43 in the C-band. Similarly, the wavelength converter 48 can convert wavelengths from the U-band to the L-band. Therefore, the wavelength converter 48 allocates the optical signals in the U-band guided from the WSS 44 in the L-band. Note that, although not particularly limited, the wavelength converters (47, 48) may be realized by, for example, periodically poled lithium niobate (PPLN). Alternatively, the wavelength converters (47, 48)

may be realized by a nonlinear optical medium and a light source that generates pump light.

The WSS 49 processes the optical signal output from the wavelength converter 47 and the optical signal output from the wavelength converter 48. At this point, the WSS 49 guides each optical signal to the add-drop unit 61. When the add-drop unit 61 includes a plurality of transponders or a plurality of transponder aggregators (TPA), the WSS 49 can guide each optical signal to the transponders or the transponder aggregators (TPA) corresponding to the wavelengths.

The WSS 45 processes the C-band WDM signal extracted by the wavelength filter 41. Specifically, the WSS 45 guides an optical signal to be transmitted to the node N2 to the WSS 57, and guides an optical signal to be transmitted to the access network to the WSS 50. In other words, the optical signal branched from the C-band WDM signal by the WSS 45 is guided to the WSS 50, and the remaining optical signal that is not branched from the C-band WDM signal is guided to the WSS 57. Similarly, the WSS 46 processes the L-band WDM signal extracted by the wavelength filter 41. Specifically, the WSS 46 guides an optical signal to be transmitted to the node N2 to the WSS 58, and guides an optical signal to be transmitted to the access network to the WSS 50. In other words, the optical signal branched from the L-band WDM signal by the WSS 46 is guided to the WSS 50, and the remaining optical signal that is not branched from the L-band WDM signal is guided to the WSS 58.

The WSS 50 processes the optical signal in the C-band output from the WSS 45 and the optical signal in the L-band output from the WSS 46. At this point, the WSS 50 guides each optical signal to the add-drop unit 61. When the add-drop unit 61 includes a plurality of transponders or a plurality of transponder aggregators (TPA), the WSS 50 can guide each optical signal to the transponders or the transponder aggregators (TPA) corresponding to the wavelengths.

The WSS 51 processes an optical signal directed from the add-drop unit 61 to the node N2. At this point, the optical signal allocated in the C-band is guided to the wavelength converter 53, and the optical signal allocated in the L-band is guided to the wavelength converter 54.

The wavelength converter 53 can convert wavelengths from the C-band to the S-band. Therefore, the optical signal guided from the WSS 51 is allocated in the S-band by the wavelength converter 53. The wavelength converter 54 can convert wavelengths from the L-band to the U-band. Therefore, the optical signal guided from the WSS 51 is allocated in the U-band by the wavelength converter 54. The optical signals output from the wavelength converter 53 and wavelength converter 54 are guided to the WSS 55 and WSS 56, respectively. Note that the wavelength converters (53, 54) may be realized by, for example, PPLN. Alternatively, the wavelength converters (53, 54) may be realized by a nonlinear optical medium and a light source that generates pump light.

The WSS 55 processes the optical signal guided from the WSS 43 and the optical signal output from the wavelength converter 53. Thus, an S-band WDM signal is generated. Similarly, the WSS 56 processes the optical signal guided from the WSS 44 and the optical signal output from the wavelength converter 54. Thus, a U-band WDM signal is generated.

The WSS 52 processes an optical signal directed from the add-drop unit 61 to the node N2. At this point, the optical signal allocated in the C-band is guided to the WSS 57, and the optical signal allocated in the L-band is guided to the WSS 58.

The WSS 57 processes the optical signal guided from the WSS 45 and the optical signal guided from the WSS 52. Thus, a C-band WDM signal is generated. Similarly, the WSS 58 processes the optical signal guided from the WSS 46 and the optical signal output from the WSS 52. Thus, an L-band WDM signal is generated.

The combiner 60 combines the S-band WDM signal output from the WSS 55, the U-band WDM signal output from the WSS 56, the C-band WDM signal output from the WSS 57, and the L-band WDM signal output from the WSS 58. Thus, an S/C/L/U-band WDM signal is generated. In other words, the S/C/L/U-band WDM signal is transmitted from the ROADM 40 to the node N2. Note that the WDM signals output from the WSSs 55 to 58 are each amplified by the optical amplifiers 59.

The add-drop unit 61 guides optical signals guided from the WSS 49 and WSS 50 to the access network or a destination device under the ROADM 40. In other words, the optical signal branched from the input WDM signal is guided to the access network or a destination device under the ROADM 40 by the add-drop unit 61. The add-drop unit 61 can insert the optical signal received from the access network or a source device under the ROADM 40 into the output WDM signal. At this point, the signal to be allocated in the S-band or U-band on a path between the ROADM 40 and the node N2 is guided to the WSS 51. The signal to be allocated in the C-band or L-band on a path between the ROADM 40 and the node N2 is guided to the WSS 52.

Note that the WSS 49 and the WSS 50 operate as a WSS circuit to guide an optical signal branched from the first WDM signal and an optical signal branched from the second WDM signal to an access network connected to the optical communication device 40. As an example, the first WDM signal is a C-band WDM signal and the second WDM signal is an S-band WDM signal. Alternatively, the first WDM signal is a L-band WDM signal and the second WDM signal is a U-band WDM signal.

As described above, the ROADM 40 can process the S/C/L/U-band WDM signal as the ROADM 20 illustrated in FIG. 3. The WSS 43 and WSS 55 are configured to process S-band WDM signal. The WSS 44 and WSS 56 are configured to process U-band WDM signal. The WSS 45 and WSS 57 are configured to process C-band WDM signal. The WSS 46 and WSS 58 are configured to process L-band WDM signal. The WSS 49, WSS 50, WSS 51, and WSS 52 are configured to process C-band and L-band WDM signals, respectively. In other words, according to the embodiment of the present invention illustrated in FIG. 5, the band of the WDM signal that can be processed by the ROADM is expanded without increasing the bandwidth of each of the WSSs.

In addition, in the ROADM 40, the optical signal forwarded to the node N2 without being branched from the WDM signal does not pass through a wavelength converter. Specifically, among the optical signals included in the S-band WDM signal received from the node N1, an optical signal forwarded to the node N2 is guided to the degree #2 by the WSS 43 and WSS 55. Similarly, among the optical signals included in the U-band WDM signal received from the node N1, an optical signal forwarded to the node N2 is guided to the degree #2 by the WSS 44 and WSS 56. Note that, in the following description, an optical signal forwarded to a next node without being branched from a WDM signal in a ROADM may be referred to as a "through signal".

As described above, according to the embodiment of the present invention, unlike the configuration illustrated in FIG. 3, the through signal does not pass through a wavelength converter. Therefore, according to the embodiment of the present invention, the noise added to the through signal is suppressed as compared with the configuration illustrated in FIG. 3. Therefore, in a case where an optical signal is forwarded to a destination node via a plurality of ROADMs, the accumulation of degradation of the OSNR is suppressed.

Figure 6A:
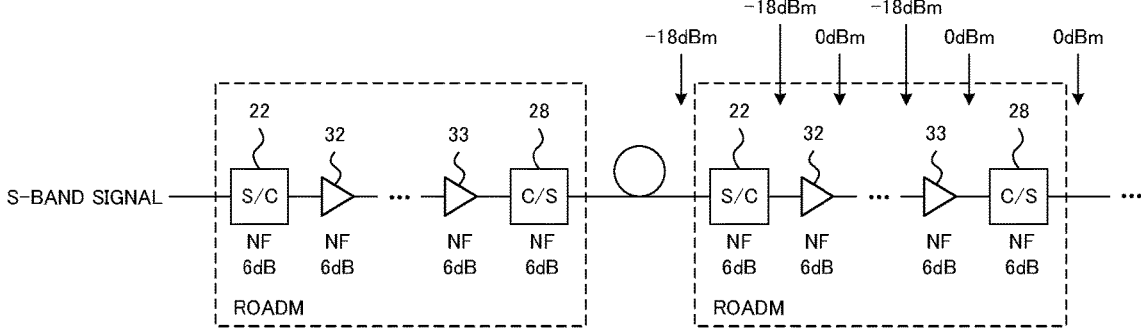
FIGS. 6A and 6B illustrate examples of the level and noise figure of an optical signal transmitted by a ROADM.
Figure 6B:
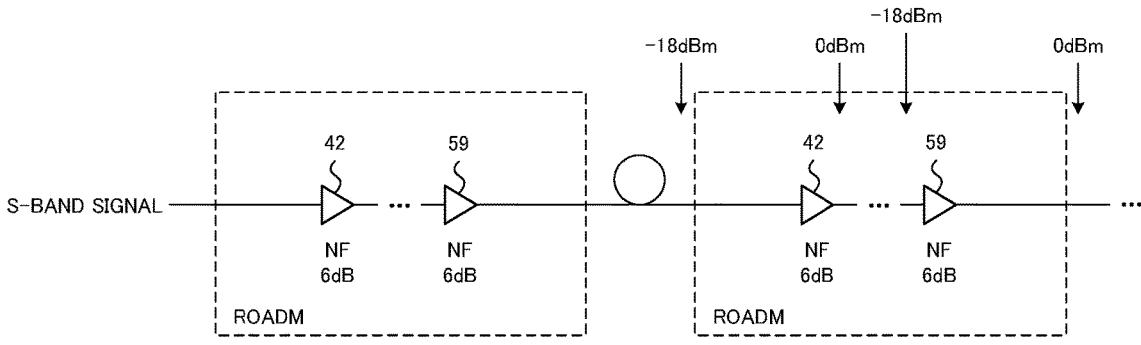

FIGS. 6A and 6B illustrate examples of the level and noise figure of an optical signal transmitted by a ROADM. FIG. 6A illustrates an example of the level and noise figure of an optical signal transmitted by the ROADM 20 illustrated in FIG. 3. FIG. 6B illustrates an example of the level and noise figure of an optical signal transmitted by the ROADM 40 according to the embodiment of the present invention. It is assumed that an optical signal in the S-band WDM signal is transmitted.

In this embodiment, the input optical level of the ROADMs (20, 40) is −18 dBm. The gain of the optical amplifiers (32, 33, 42, 59) is 18 dB. The conversion efficiency of the wavelength converters (22, 28) is 0 dB. The noise figure (NF) of each optical amplifier is 6 dB. The noise figure of each wavelength converter is 6 dB. The loss to the through signal in the ROADM is 18 dB.

When an optical signal is transmitted via a plurality of ROADMs, OSNR at each node (that is, each ROADM) is expressed by Formula (1). Pin represents the input optical power of a ROADM. NF represents the noise figure illustrated in FIG. 6A or 6B. h represents Planck's constant. v represents the frequency of light. $\Delta f$ represents the bandwidth when the noise figure is measured.

$$OSNR = \frac{P_{in}}{NFhv\Delta f} \qquad (1)$$

When an optical signal is transmitted via a plurality of ROADMs, OSNR_RX at the reception node is expressed by Formula (2). Note that OSNRi represents the OSNR at each node and is calculated by Formula (1) described above.

$$OSNR\_RX = \frac{1}{\sum (1/OSNRi)} \qquad (2)$$

Figure 7:
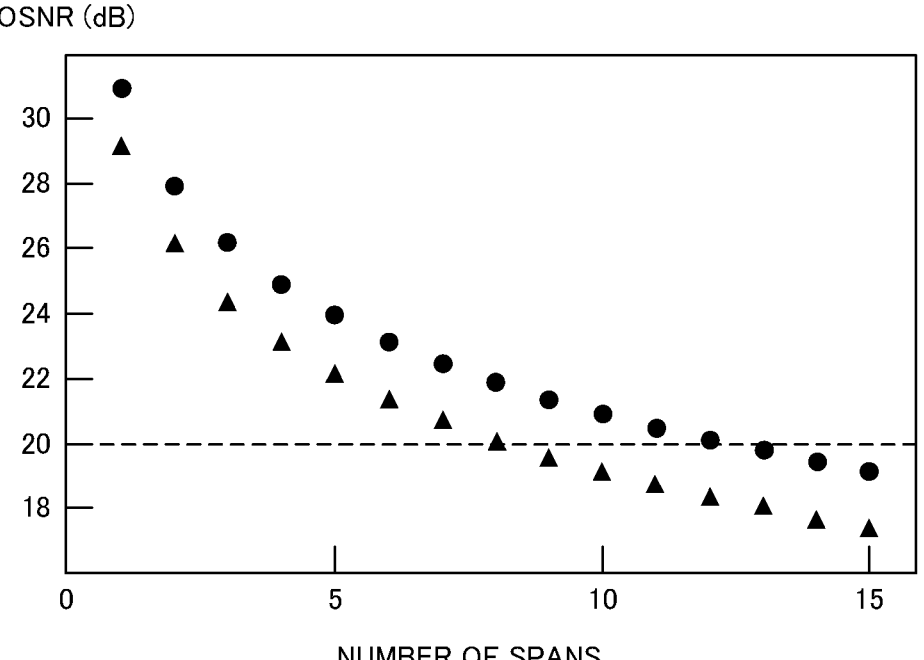
FIG. 7 illustrates an effect according to an embodiment of the present invention.

FIG. 7 illustrates an effect according to an embodiment of the present invention. The horizontal axis represents the number of spans of the path through which an optical signal is transmitted. In other words, the horizontal axis represents the number of ROADMs provided between the transmission node and the reception node. The vertical axis represents the OSNR at the reception node, which is calculated by Formula (2) described above. The triangular symbol represents the OSNR in the WDM transmission system in which the ROADM 20 illustrated in FIG. 3 is provided at each node. The OSNR is calculated based on the model illustrated in FIG. 6A. The circular symbol represents the OSNR in the WDM transmission system in which the ROADM 40 according to the embodiment of the present invention is provided at each node. The OSNR is calculated based on the model illustrated in FIG. 6B.

In both cases, as the number of spans increases, the reception OSNR degrades. However, as compared with the configuration illustrated in FIG. 3, the degradation of the reception OSNR is suppressed according to the embodiment of the present invention. In other words, as compared with the configuration illustrated in FIG. 3, the reception OSNR is improved according to the embodiment of the present invention. As a result, by implementing the ROADM according to the embodiment of the present invention, the number of spans through which an optical signal can be transmitted increases. For example, it is assumed that a reception OSNR higher than 20 dB is required to realize high-quality optical communication. In this case, transmission of eight spans is possible in the configuration illustrated in FIG. 3. On the contrary, transmission of 12 spans is possible according to the embodiment of the present invention.

EXAMPLES

Figure 8:
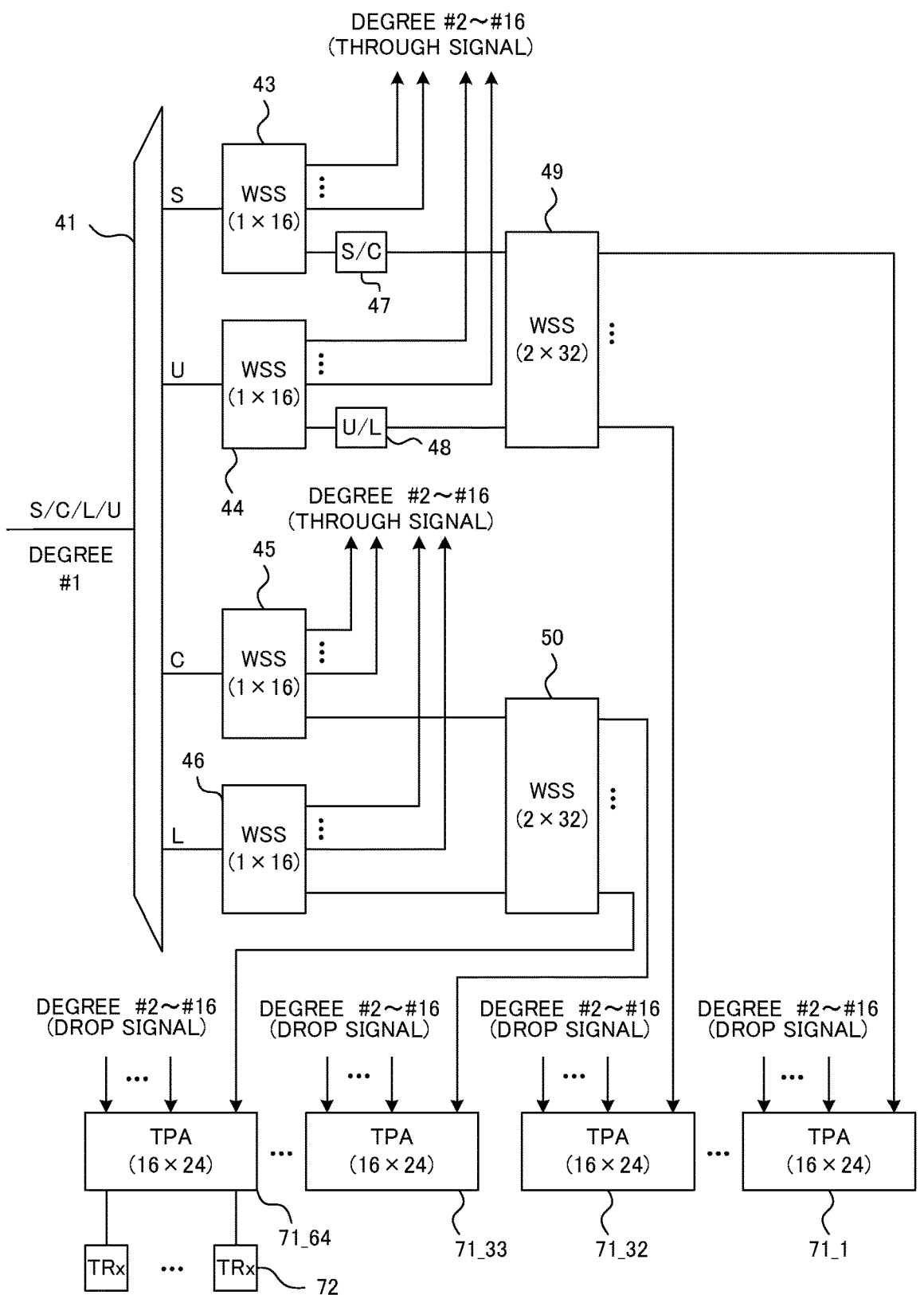
FIG. 8 illustrates a configuration example of a reception circuit of a 16-degree ROADM.
Figure 9:
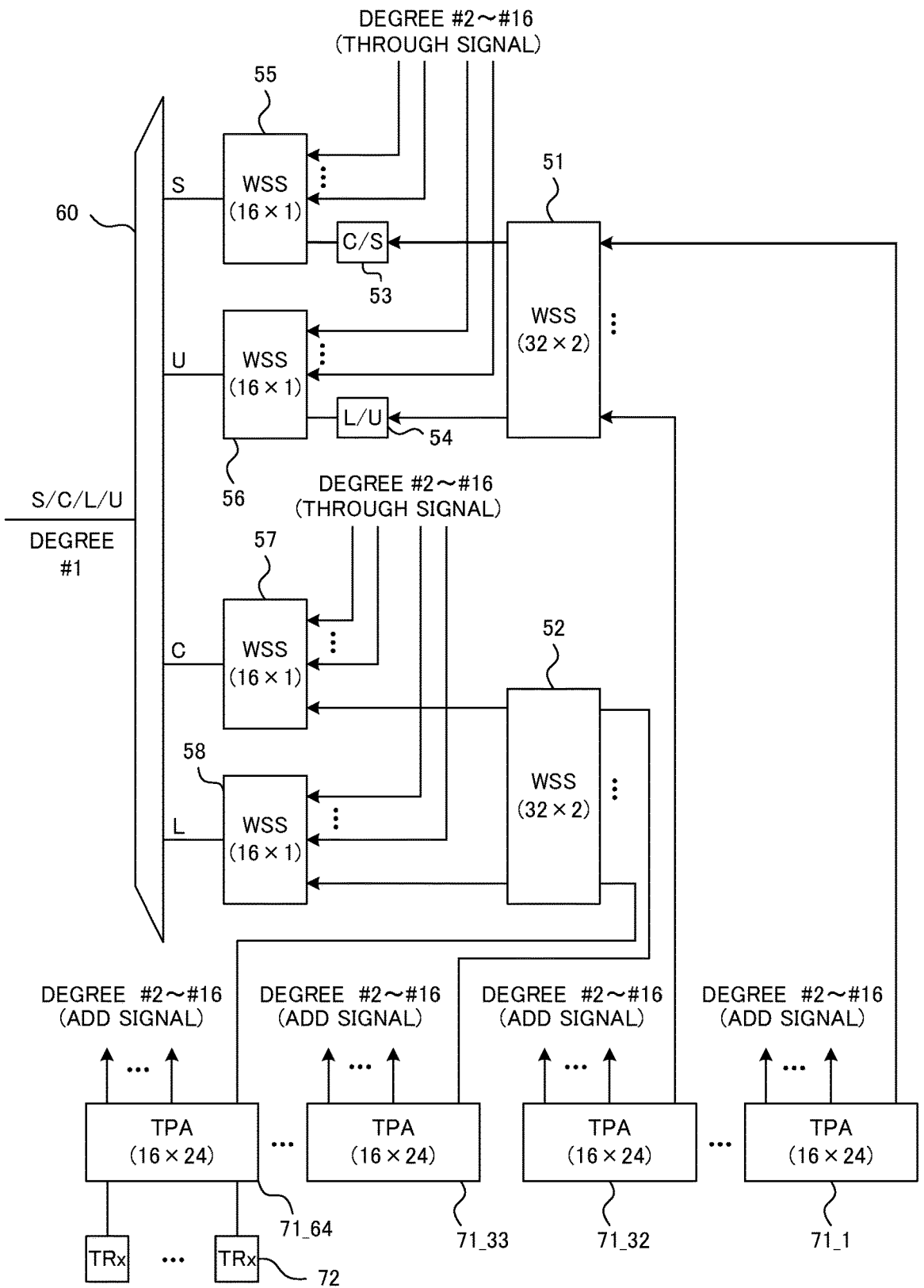
FIG. 9 illustrates a configuration example of a transmission circuit of the 16-degree ROADM.

FIGS. 8 and 9 illustrate configuration examples of a 16-degree ROADM. In other words, this ROADM has 16 degrees (#1 to #16). Note that FIG. 8 illustrates a reception circuit that processes the WDM signal received via the degree (line) #1. This reception circuit corresponds to the WSS 11 (#1) in the configuration illustrated in FIG. 2. FIG. 9 illustrates a transmission circuit that outputs a WDM signal to the degree (line) #1. This transmission circuit corresponds to the WSS 12 (#1) in the configuration illustrated in FIG. 2. Note that FIGS. 8 and 9 are configuration examples of the ROADM 40 illustrated in FIG. 5. However, in FIGS. 8 and 9, the optical amplifiers 42 and 59 are omitted.

The ROADM illustrated in FIGS. 8 and 9 include 64 transponder aggregators (TPA) 71_1 to 71_64. The TPAs 71_1 to 71_64 are provided in the add-drop unit 61 illustrated in FIG. 5. A plurality of transponders (TRx) 72 are connected to each of the TPAs 71_1 to 71_64.

As illustrated in FIG. 8, the WSSs 43 to 46 each include one input port and 16 outputs ports in this example. The through signal is guided to the corresponding degrees (#2 to #16) by the WSSs 43 to 46. The WSSs 49 and 50 each include two input ports and 32 output ports in this example. The output ports of the WSS 49 are respectively connected to the TPAs 71_1 to 71_32. The output ports of the WSS 50 are respectively connected to the TPAs 71_33 to 71_64. Each of the TPAs 71_1 to 71_64 includes 16 input ports. The drop signal in the WDM signal received via each of the degrees (#1 to #16) is guided to the corresponding input port of each of the TPAs 71_1 to 71_64.

As illustrated in FIG. 9, the WSSs 51 and 52 each include 32 input ports and two output ports in this example. The add signal output from the corresponding port of the TPAs 71_1 to 71_32 is guided to the input ports of the WSS 51. The add signal output from the corresponding port of the TPAs 71_33 to 71_64 is guided to the input ports of the WSS 52. The WSSs 55 to 58 each include 16 input ports and one output port in this example. Each of the WSSs 55 to 58 multiplexes the through signal received from another node and the add signal.

In the configuration illustrated in FIG. 8, the ROADM 40 includes the WSSs (43 to 46) that select degrees and the WSSs (49 and 50) that select transponder aggregators (TPA), but the embodiment of the present invention is not limited to this configuration. For example, the ROADM 40 may not include the WSSs 49 and 50. In this case, the branch signals extracted by the WSSs 43 and 44 may be guided to the add-drop unit 61 via the wavelength converters 47 and 48. The drop signals extracted by the WSSs 45 and 46 may be directly guided to the add-drop unit 61. In this configuration, the add-drop unit 61 may include a WSS that selects a transponder. Similarly, in the configuration illustrated in FIG. 9, the ROADM 40 may not include the WSSs 51 and 52.

Figure 10:
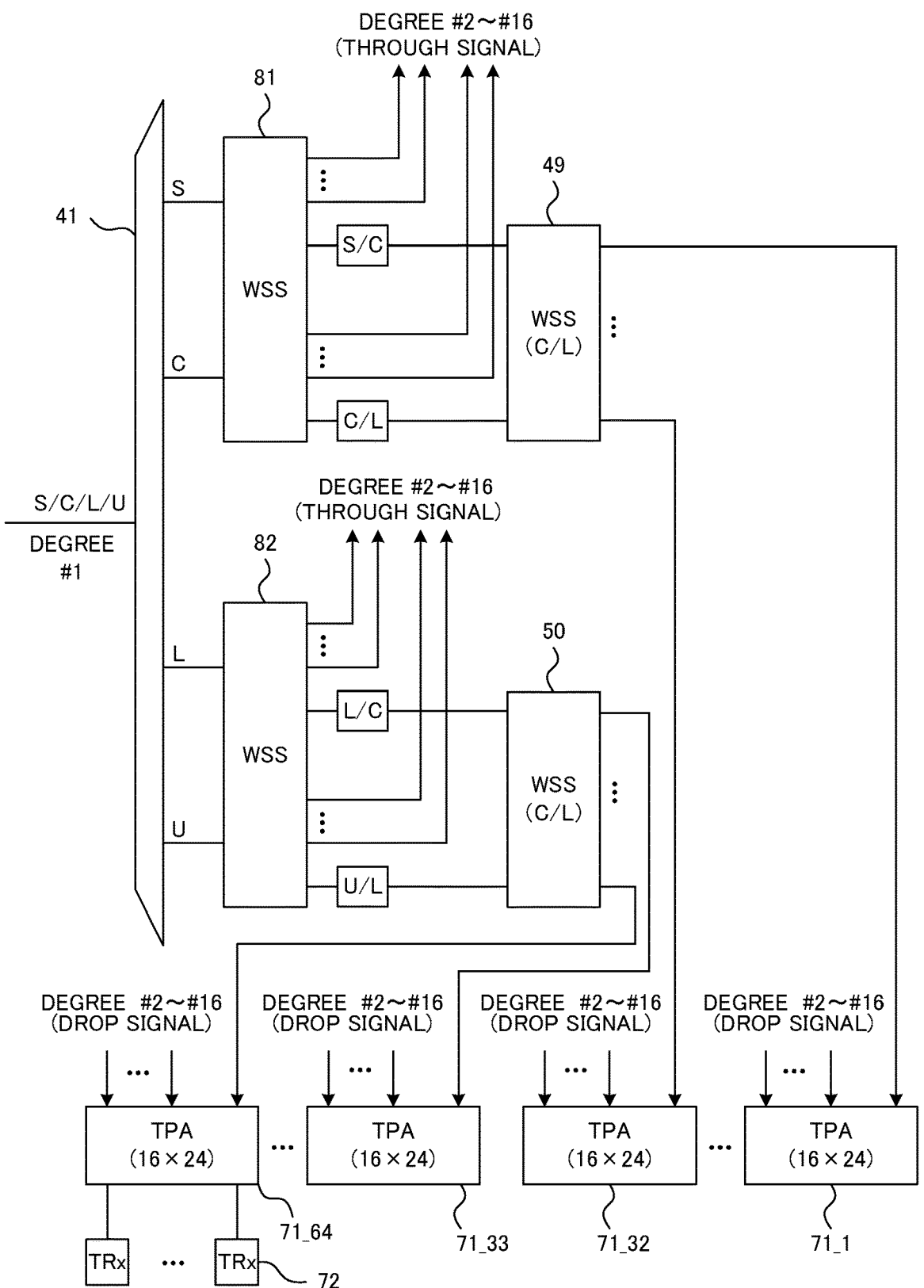
FIG. 10 illustrates a variation of the ROADM according to the embodiment of the present invention.

In the configuration illustrated in FIG. 8, the WSS 43, WSS 44, WSS 45, and WSS 46 are provided for the-S band, U-band, C-band, and L-band, respectively, but the embodiment of the present invention is not limited to this configuration. For example, as illustrated in FIG. 10, the WSS 81 capable of processing the WDM signal of the S/C-band and the WSS 82 capable of processing the WDM signal of the L/U-band may be provided, instead of the WSS 43 to the WSS 46 illustrated in FIG. 8. The drop signal in the S-band and the drop signal in the C-band output from the WSS 81 may be converted to a drop signal in the C-band and a drop signal in the L-band, respectively, by the corresponding wavelength converters. The drop signal in the L-band and the drop signal in the U-band output from the WSS 82 may be converted to a drop signal in the C-band and a drop signal in the L-band, respectively, by the corresponding wavelength converters. In this case, both of the WSS 49 and WSS 50 can be realized by devices that process the C/L-band. Similarly, in the configuration illustrated in FIG. 9, the four WSSs (55 to 58) may be replaced with two WSSs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical communication device that processes a WDM (wavelength division multiplexing) in WDM signal a transmission system that uses a first wavelength band and a second wavelength band different from the first wavelength band, the optical communication device comprising:

a wavelength filter configured to extract a first WDM signal allocated in the first wavelength band and a second WDM signal allocated in the second wavelength band from a reception WDM signal received from a first node of the WDM transmission system;

a first wavelength selective switch configured to process the first WDM signal extracted by the wavelength filter;

a second wavelength selective switch configured to process the second WDM signal extracted by the wavelength filter;

a third wavelength selective switch;

a wavelength converter configured to convert wavelengths from the second wavelength band to a third wavelength band;

a fourth wavelength selective switch configured to process an optical signal in the first wavelength band;

a fifth wavelength selective switch configured to process an optical signal in the second wavelength band; and a combiner configured to combine an optical signal output from the fourth wavelength selective switch and an optical signal output from the fifth wavelength selective switch, wherein an optical signal branched from the first WDM signal by the first wavelength selective switch is guided to the third wavelength selective switch, a remaining optical signal that is not branched from the first WDM signal by the first wavelength selective switch is guided to the fourth wavelength selective switch, an optical signal branched from the second WDM signal by the second wavelength selective switch is guided to the third wavelength selective switch via the wavelength converter, a remaining optical signal that is not branched from the second WDM signal by the second wavelength selective switch is guided to the fifth wavelength selective switch, and the third wavelength selective switch guides the optical signal branched from the first WDM signal and the optical signal branched from the second WDM signal to an access network connected to the optical communication device.

2. The optical communication device according to claim 1, further comprising a second wavelength converter configured to convert wavelengths from the third wavelength band to the second wavelength band, wherein an optical signal to be transmitted to a second node using a wavelength channel in the first wavelength band among optical signals directed from the access network to the second node is guided to the fourth wavelength selective switch by the third wavelength selective switch, and an optical signal to be transmitted to the second node using a wavelength channel in the second wavelength band among optical signals directed from the access network to the second node is guided to the fifth wavelength selective switch via the second wavelength converter by the third wavelength selective switch.

3. The optical communication device according to claim 1, wherein the third wavelength band is identical to the first wavelength band.

4. The optical communication device according to claim 1, wherein the third wavelength band is different from the first wavelength band.

5. The optical communication device according to claim 1, wherein the first wavelength band is C-band or L-band, the second wavelength band is S-band or U-band, and the third wavelength band is C-band or L-band.

6. A transmission control method of processing a WDM (wavelength division multiplexing) signal using an optical communication device provided at a node between a first node and a second node in a WDM transmission system that uses a first wavelength band and a second wavelength band different from the first wavelength band, wherein the optical communication device comprises:

a wavelength filter configured to extract a first WDM signal allocated in the first wavelength band and a second WDM signal allocated in the second wavelength band from a reception WDM signal received from the first node;

a first wavelength selective switch configured to process the first WDM signal extracted by the wavelength filter;

a second wavelength selective switch configured to process the second WDM signal extracted by the wavelength filter;

a third wavelength selective switch;

a wavelength converter configured to convert wavelengths from the second wavelength band to a third wavelength band;

a fourth wavelength selective switch configured to process an optical signal in the first wavelength band;

a fifth wavelength selective switch configured to process an optical signal in the second wavelength band; and a combiner configured to combine an optical signal output from the fourth wavelength selective switch and an optical signal output from the fifth wavelength selective switch, the transmission control method comprising:

guiding an optical signal, that is branched from the first WDM signal by the first wavelength selective switch, to the third wavelength selective switch;

guiding a remaining optical signal, that is not branched from the first WDM signal, to the fourth wavelength selective switch;

guiding an optical signal, that is branched from the second WDM signal by the second wavelength selective switch, to the third wavelength selective switch via the wavelength converter;

guiding a remaining optical signal, that is not branched from the second WDM signal, to the fifth wavelength selective switch; and the third wavelength selective switch guides the optical signal branched from the first WDM signal and the optical signal branched from the second WDM signal to an access network connected to the optical communication device.

* * * * *